United States Patent
Yang et al.

(10) Patent No.: US 8,194,050 B2
(45) Date of Patent: Jun. 5, 2012

(54) SENSING CIRCUIT DISCHARGE CONTROL METHOD AND DEVICE FOR TOUCH PANEL

(75) Inventors: Kai-Chieh Yang, Miao-Li County (TW); Fu-Yuan Hsueh, Miao-Li County (TW); I-Lin Wu, Miao-Li County (TW)

(73) Assignee: Chimei Innolux Corporation (TW)

( * ) Notice: Subject to any disclaimer, the term of this patent is extended or adjusted under 35 U.S.C. 154(b) by 405 days.

(21) Appl. No.: 12/560,756

(22) Filed: Sep. 16, 2009

(65) Prior Publication Data

US 2010/0073324 A1    Mar. 25, 2010

(30) Foreign Application Priority Data

Sep. 19, 2008  (TW) ............................... 97136054 A

(51) Int. Cl.
*G06F 3/045* (2006.01)

(52) U.S. Cl. .................................. 345/174; 178/18.06

(58) Field of Classification Search .................... None
See application file for complete search history.

(56) References Cited

U.S. PATENT DOCUMENTS

| 8,054,299 B2 * | 11/2011 | Krah ............................ 345/174 |
| 8,058,937 B2 * | 11/2011 | Qin et al. ..................... 331/111 |

* cited by examiner

*Primary Examiner* — Jason Olson
(74) *Attorney, Agent, or Firm* — Lowe Hauptman Ham & Berner, LLP

(57) ABSTRACT

A sensing circuit discharge control method and device for a touch panel are disclosed. A discharging duration of a current source in the sensing circuit of the touch panel is fine tuned in a digital control manner, so as to control the discharging amount of the sensing circuit without frequently adjusting the discharging current of the current source. By using the present invention, discharging time difference between a condition in which a touch event occurs and a condition in which no touch event occurs for each sensing circuit can approach the same.

17 Claims, 8 Drawing Sheets

US 8,194,050 B2

SENSING CIRCUIT DISCHARGE CONTROL METHOD AND DEVICE FOR TOUCH PANEL

RELATED APPLICATIONS

The present application is based on, and claims priority from, Taiwanese Application Number 097136054, filed Sep. 19, 2008, the disclosure of which is hereby incorporated by reference herein in its entirety.

TECHNICAL FIELD

The present invention relates to a touch panel, more particularly, to a method and device for controlling discharge of each sensing circuit of the touch panel.

BACKGROUND

Touch panels have been widely used in various applications. A touch panel comprises sensing lines arranged in a crisscross pattern. A sensing circuit is provided for sensing a position of the touch panel where a finger touches.

FIG. 1 is an illustration of a sensing circuit 10 of a touch panel (not shown). The sensing circuit 10 comprises a sensing electrode 100 and a discharging unit 110. The sensing electrode 100 has an intrinsic capacitance, which is a parasitic capacitance represented by a capacitor 104. A total capacitance of the sensing electrode 100 increases when a touch event occurs. The touch event is equivalent to an additional capacitance, which is represented by a sensing capacitor 102. That is, the sensing capacitor 102 has a nonzero capacitance when the touch event occurs, while the capacitance of the sensing capacitor 102 is zero in a condition that no touch event occurs. The capacitance of the sensing capacitor 102 is much less than that of the parasitic capacitor 104 even when a touch event occurs. A modifying capacitor 116 is used to compensate the parasitic capacitance of the sensing electrode 100 so that the parasitic capacitances of the respective sensing electrodes 100 will not significantly differ from each other.

The discharging unit 110 is connected to a voltage source $V_{DD}$ via a switch 114 so as to precharge the capacitances (i.e. the sensing capacitor 102 and the parasitic capacitor 104) of the sensing electrode 100 to a predetermined voltage level such as 5V. A first current source 127 and a second current source 138 discharge in succession by controlling switches 123 and 134. The first current source 127 is a large current source, of which a current level is about 300 µA, for example. The second current source 138 is a small current source, of which a current level is about 90 nA, for example.

To discharge the sensing circuit 10, the first current source (i.e. the large current source) 127 is switched on first to discharge for a predetermined duration. The precharged voltage level of 5V decreases to about 1V. During the duration that the large current source 127 discharges, the second current source (i.e. the small current source) 138 is disconnected. Then the large current source 127 is disconnected, the small current source 138 is switched on to discharge the residual charges. The duration to complete the discharge of the sensing circuit 10 for a condition that a finger touch event occurs is very different from that for a condition that no finger touch event occurs, since the total capacitances are different. Therefore, the duration to complete the discharge can be used to determine whether a touch event occurs or not.

In the discharging duration, the precharged voltage is reduced linearly. The sensing circuit 10 has a comparator 145 for comparing the precharged voltage and a reference voltage $V_{ref}$ with a level of 1V, for example. When the precharged voltage drops below the reference voltage $V_{ref}$, the comparator 145 transmits a status changing signal. The duration is measured from starting the discharge to transmitting the status changing signal. The sensing capacitance representing the touch event can be calibrated according to this measured duration.

FIG. 2 shows a condition that a finger touch event occurs and a condition that no finger touch event occurs for the same sensing circuit. A first curve is drawn by a solid line which represents the condition that a touch event occurs. A second curve is drawn by a dashed line which represents the condition that no touch event occurs. The total capacitance of the sensing circuit 10 is precharged to the predetermined voltage (e.g. 5V). Therefore, the voltage drop $\Delta V$ to be discharged is 5V. Then the large current source 127 discharges from time 0 to time t1. During the large current source 127 discharges, the released voltage drop is $\Delta V1$ in the condition that a touch event occurs, while the released voltage drop is $\Delta V1'$ in the condition that no touch event occurs. As mentioned, the total capacitance of the condition that the touch event occurs is greater than that of condition that no touch event occurs. Then the residual charges are released by the small current source 138. For the condition that the touch event occurs, the corresponding voltage drop of the residual charges is $\Delta V2$, and the discharge is completed at time t2. For the condition that no touch event occurs, the corresponding voltage drop of the residual charges is $\Delta V2'$, and the discharge is completed at time t2'.

Due to the process variance and so on, the parasitic capacitances of the respective sensing electrodes 100 of the touch panel may be different from each other. Although the differences are being compensated by the modifying capacitors 116, the difference cannot be completely eliminated. To correct the residual sight differences, the discharging condition of the large current source 127 needs to be fine tuned. Conventionally, such a fine tuning is carried out by adjusting the current of the large current source 127. In general, the current sources are implemented by CMOS transistors. The current level of the current source is adjusted by controlling a voltage applied to the CMOS transistor. To fine tune the current level, an exact voltage level must be provided, such as 1.9V, 2.0V, 2.1V and the like. However, it is difficult and troublesome to fine tune the voltage level in practice.

SUMMARY

An objective of the present invention is to provide a sensing circuit discharge control method and device for a touch panel. A discharge amount of the sensing circuit is controlled by fine tuning a discharging duration of a current source of the sensing circuit in a digital manner. Accordingly, discharge current of the current source needs not be frequently adjusted. By using the present invention, the discharging durations of the respective sensing electrodes of the touch panel are approached the same under a condition that a touch event occurs or a condition that no touch event occurs even if the parasitic capacitances of the respective sensing electrodes are different.

In accordance with an embodiment, a sensing circuit discharge control method comprises steps of providing a clock having a clock period; setting a current level for a large current source of the sensing circuit; setting a value P, a discharging duration of the large current source being P times the clock period; charging a sensing electrode of the sensing circuit; discharging the sensing electrode by the large current source with the set current level and discharging duration; discharging residual charges of the sensing electrode by a small current source in the sensing circuit; determining if discharge of the sensing electrode is able to be completed within a predetermined duration; and adjusting the value P to fine tune the discharging duration of the large current source if the discharge of the sensing electrode is failed to be completed within the predetermined duration.

Further, in accordance with another embodiment, a sensing circuit discharge control device comprises an edge detector for detecting when discharge of a sensing electrode of the sensing circuit is completed after the sensing electrode has been charged; a main controller for setting a value P so as to set a discharging duration of a large current source of the sensing circuit, which is P times a clock period, instructing the sensing electrode to be charged, instructing the large current source to discharge the sensing electrode with a set current level and the set discharging duration, instructing a small current source of the sensing circuit to discharge residual charges until discharge is completed and determining if the discharge of the sensing electrode is completed within a predetermine duration according to an output of the edge detector; and a duration controller for adjusting the discharging duration of the large current source. If the main controller determines that the discharge of the sensing electrode has failed to be completed within the predetermined duration, the duration controller adjusts the value P to fine tune the discharging duration of the large current source.

BRIEF DESCRIPTION

The present invention will be further described in details in conjunction with the accompanying drawings.

DETAILED DESCRIPTION OF THE INVENTION

In the present invention, a discharging duration of a large current source in a sensing circuit of a touch panel is fine tuned in a digital manner. By doing so, the inconsistencies due to the variance among parasitic capacitances of the respective sensing electrodes of the touch panel are compensated.

Figure 1:
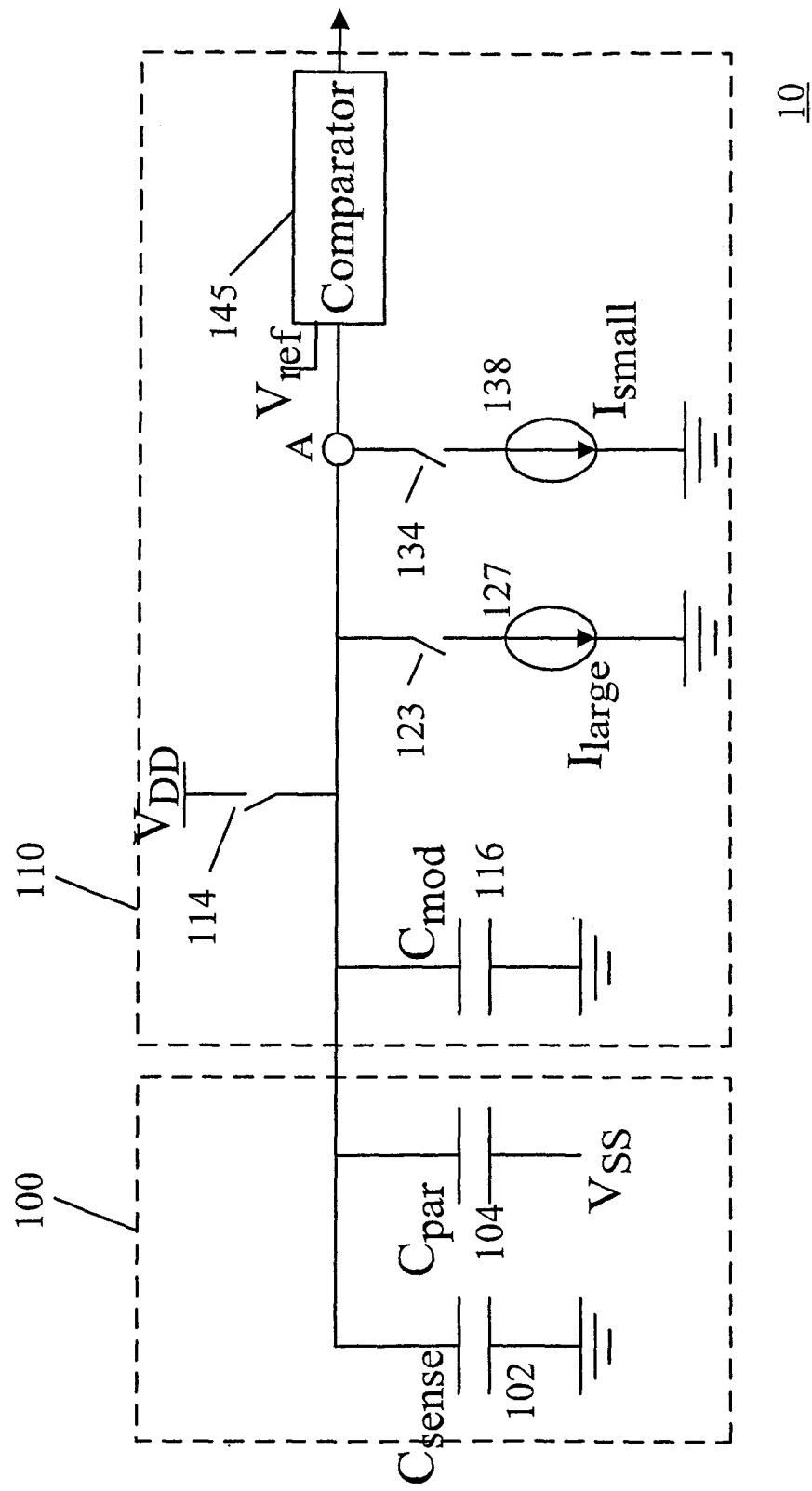
FIG. 1 is an illustration of a sensing circuit of a touch panel.
Figure 2:
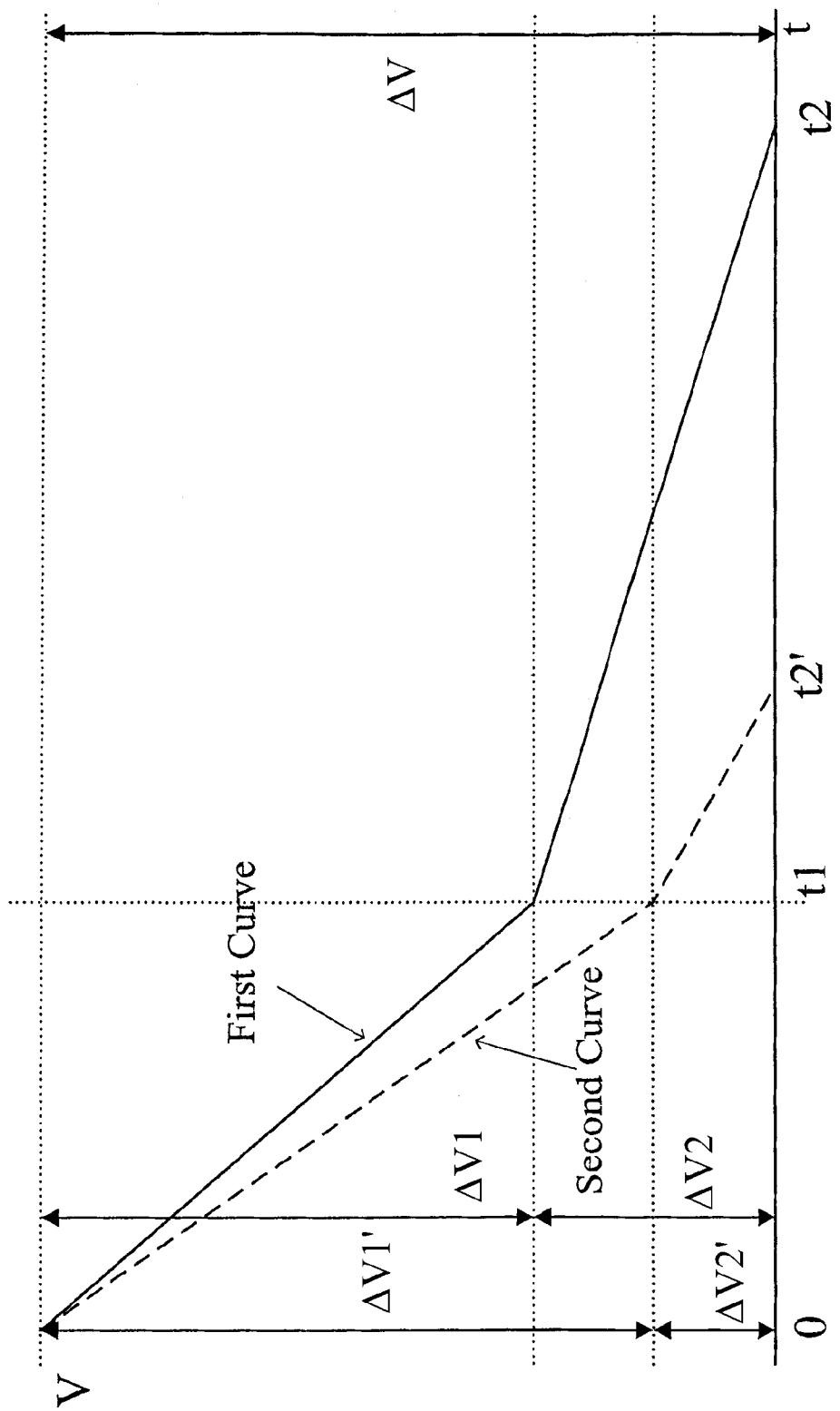
FIG. 2 is a diagram showing a condition that a finger touch event occurs and a condition that no finger touch event occurs of the sensing circuit.
Figure 3:
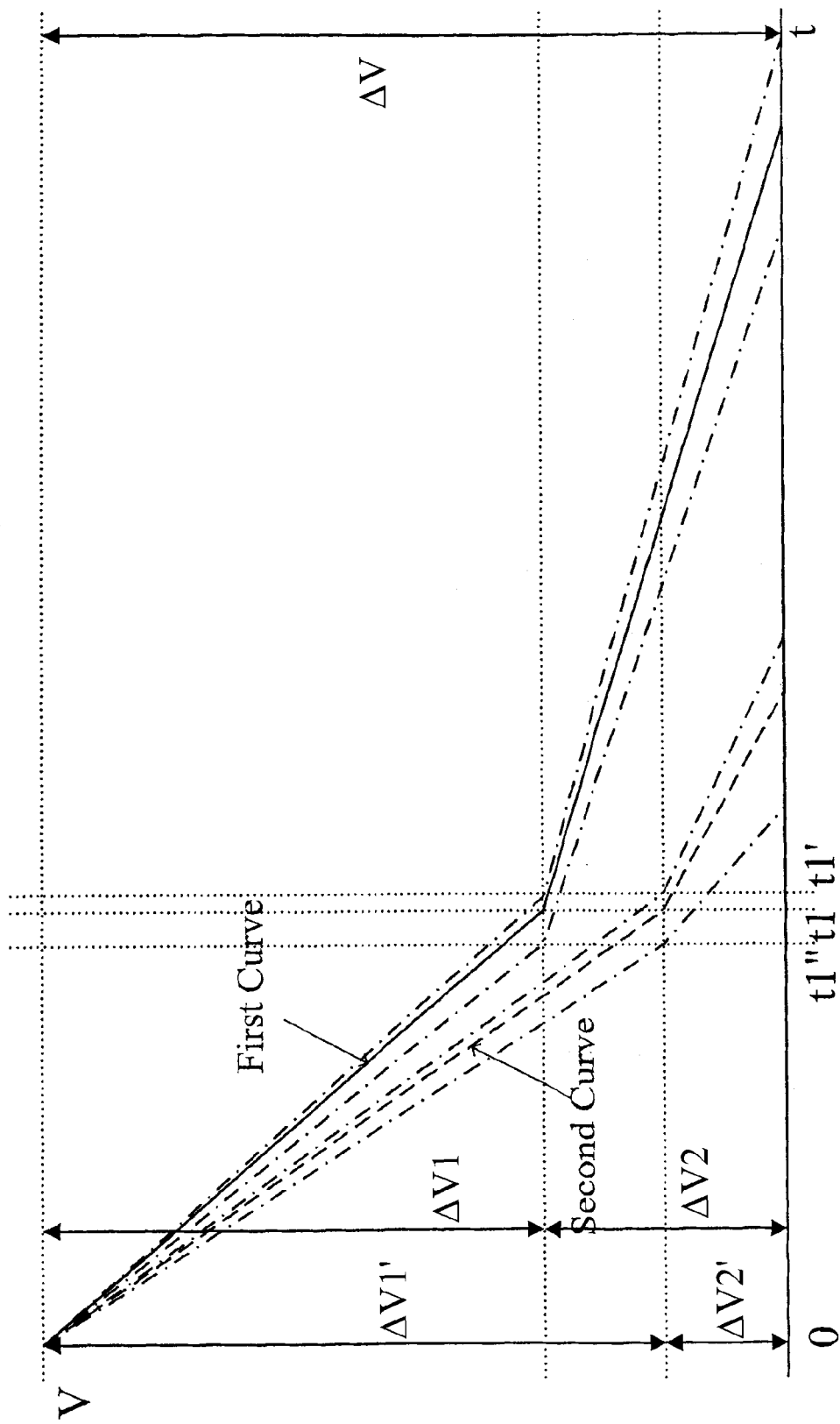
FIG. 3 is a diagram showing discharging conditions of different sensing circuits.

FIG. 3 is a diagram showing discharging conditions of different sensing circuits. Similar to FIG. 2, a first curve is drawn by a solid line which represents the condition that a touch event occurs, and a second curve is drawn by a dashed line which represents the condition that no touch event occurs. Taking the condition that no touch event occurs as an example, the large current source 127 (see FIG. 1) originally discharges from time 0 to time t1. When the total capacitance is different, the same voltage drop $\Delta V1'$ can be released by delaying the discharge ending time of the large current source 127 to t1' or advancing the discharge ending time to t1" (the corresponding curves are represented by broken lines in FIG. 3). That is, a residual voltage drop to be released by the small current source 138 (see FIG. 1) is maintained the same by fine tuning the discharging duration of the large current source even if the parasitic capacitances of the respective sensing electrodes of the touch panel are different. The discharging duration of the small current source is the same if the discharging current level is constant. The discharging current level of the small current source is much less than that of the large current source by a quantity of several thousand times. However, the voltage drops to be release by these two current sources are different by a quantity of several times. For example, the voltage drop to be released by the large current source is about 4V, while the voltage drop to be released by the small current source is about 1V. As a result, the discharging duration of the small current source is much less than that of the large current source. Therefore, the fine tuning for the discharging duration of the large current source has no affect to the determination of the existence of the sensing capacitance (i.e. whether the touch event occurs or not).

Figure 4:
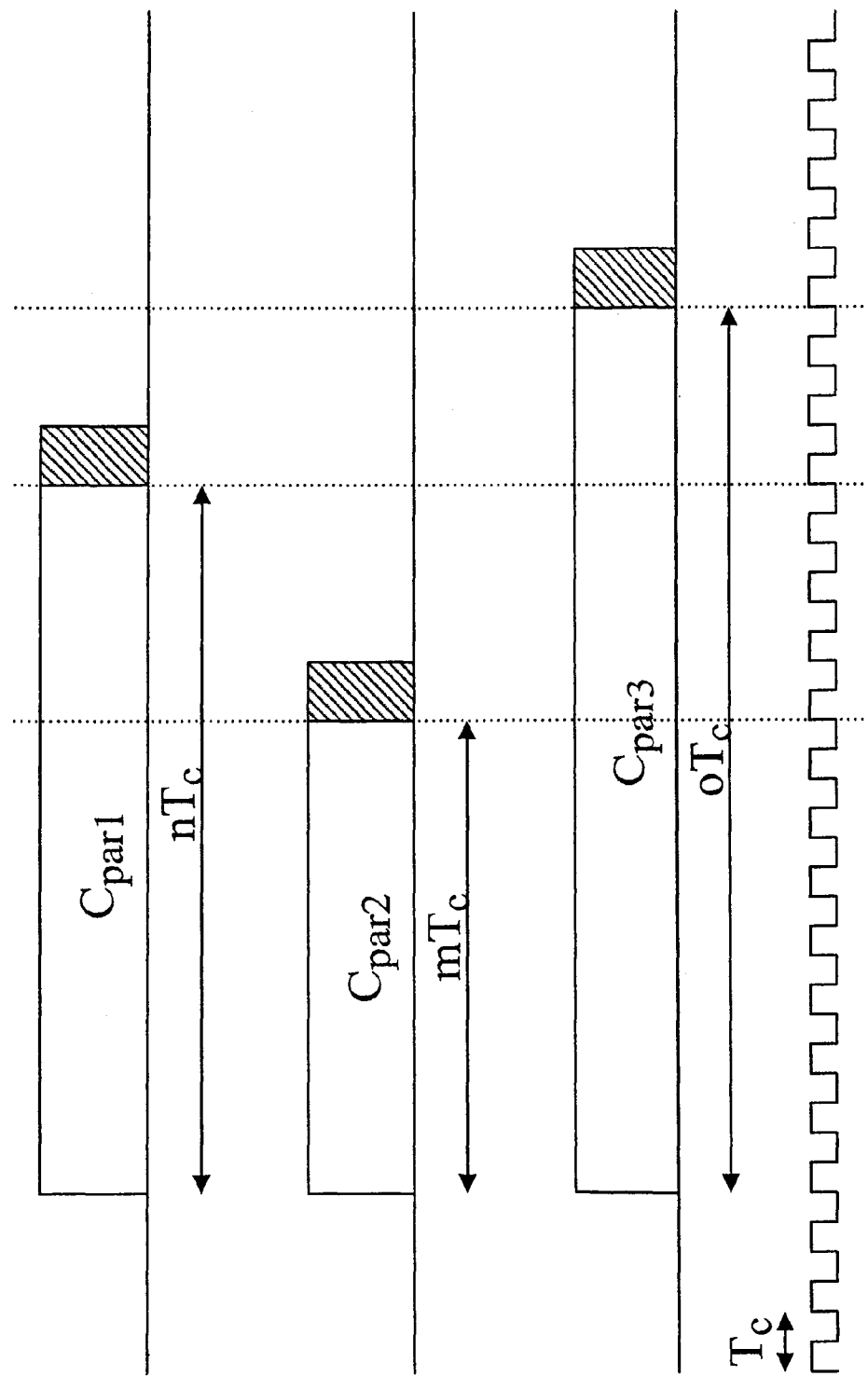
FIG. 4 shows the required discharging durations for various parasitic capacitances.

FIG. 4 shows required discharging durations for different parasitic capacitances when the discharging current level is constant. Each white portion indicates a total capacitance of a sensing electrode without a sensing capacitance (i.e. no touch event occurs), which should be solely a parasitic capacitance $C_{par}$ of the sensing electrode. Each shaded portion indicates an additional capacitance, which is added when the touch event occurs. This is the sensing capacitance. In the present invention, a clock with a period of $T_C$ is provided, as represented by a waveform at the lowermost of FIG. 4. The required discharging duration for a first parasitic capacitance $C_{par1}$ is $nT_C$, where n is 12. The required discharging duration for a second parasitic capacitance $C_{par2}$ is $mT_C$, where m is 8. The required discharging duration for a third parasitic capacitance $C_{par3}$ is $oT_C$, where o is 15. The required discharging durations for the respective parasitic capacitances are of different multiples of the clock periods $T_C$. The required discharge durations for the sensing capacitances are substantially constant. Therefore, fine tuning the discharging condition of the large current source can be achieved by adjusting the discharging duration of the large current source to be of different multiples of the clock period.

Figure 5:
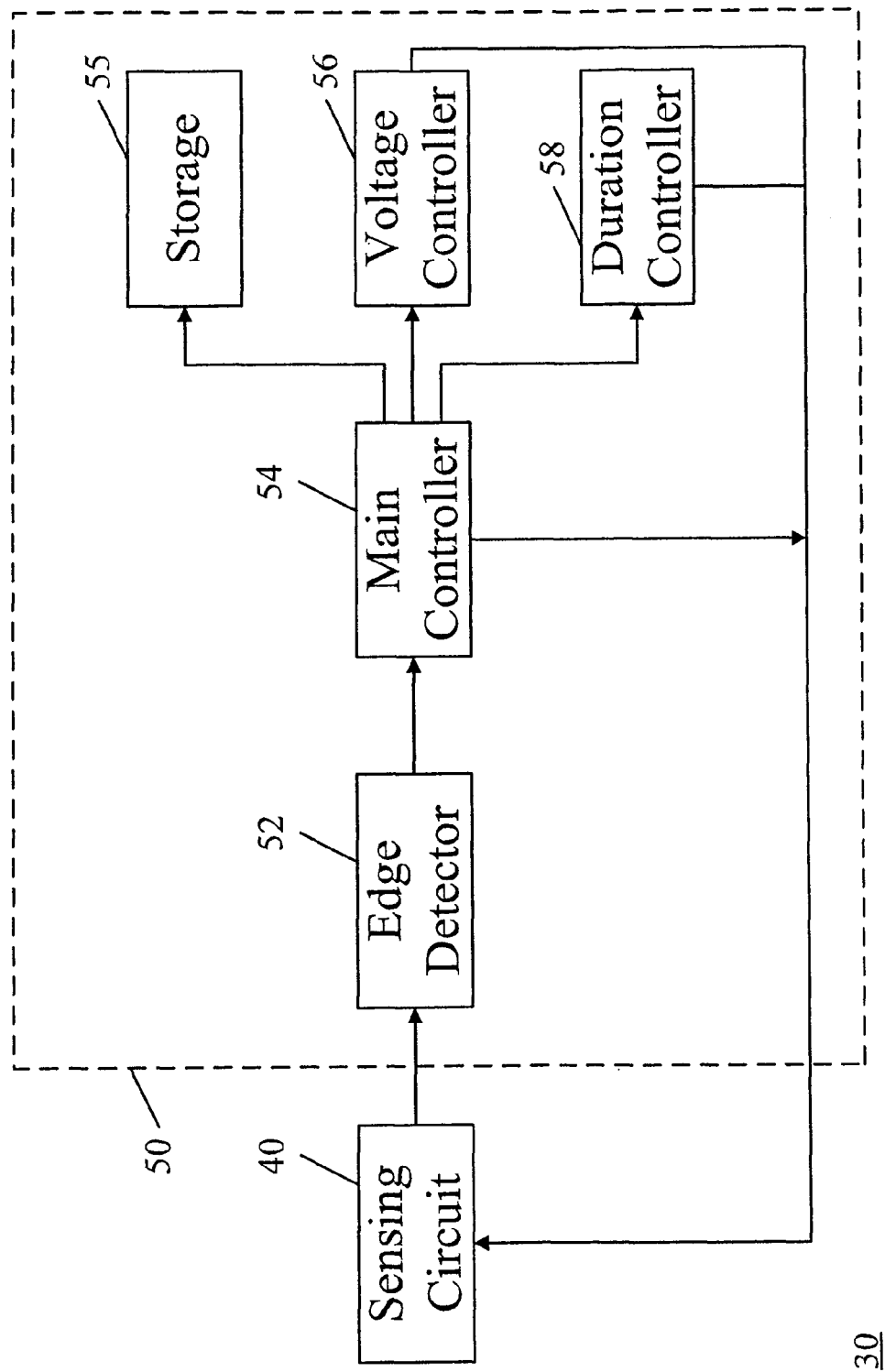
FIG. 5 is a block diagram schematically and generally showing a touch panel in accordance with the present invention, the touch panel has a sensing circuit discharge control device.
Figure 6:
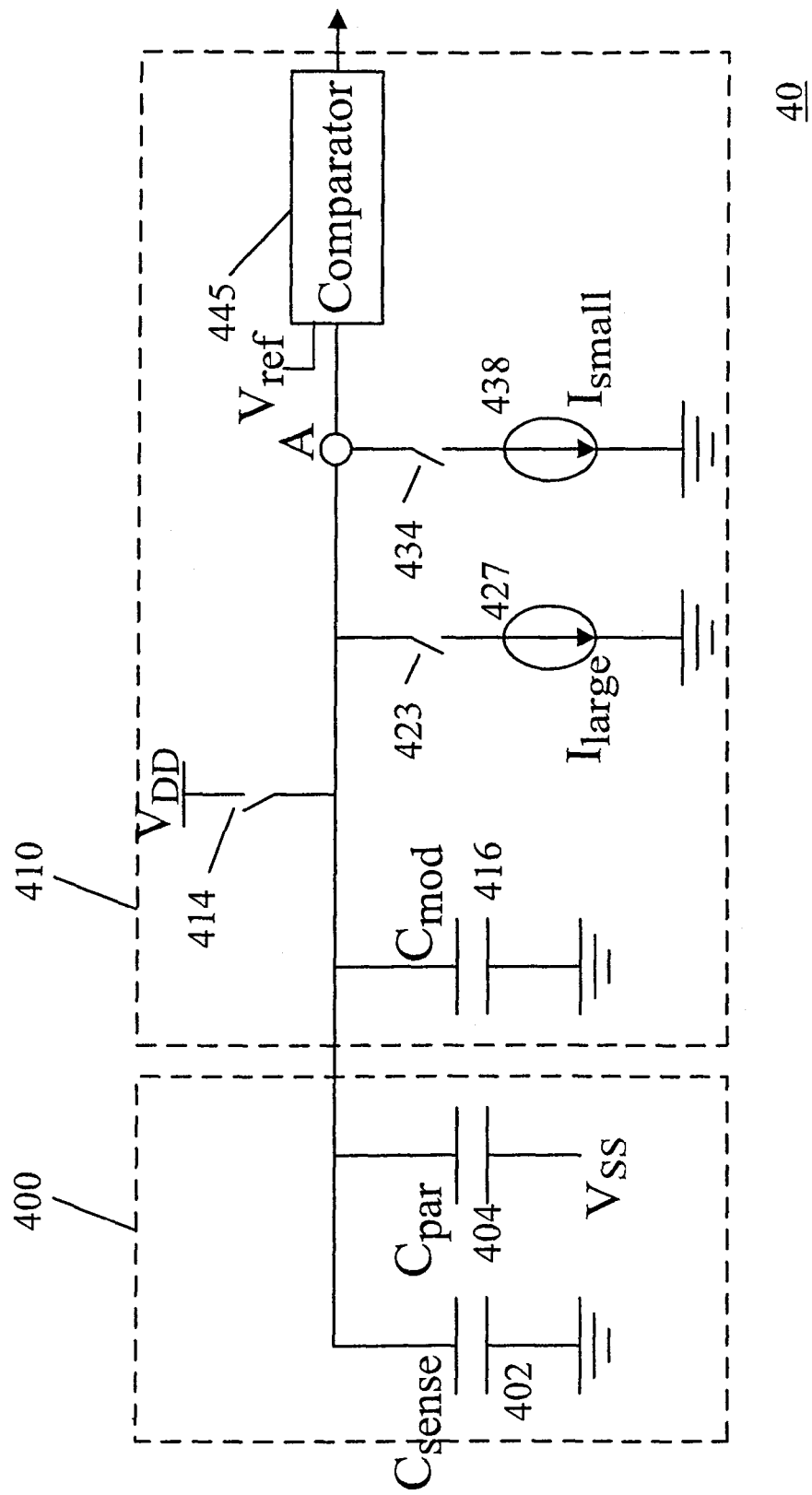
FIG. 6 is a circuit diagram schematically and generally showing a sensing circuit of the touch panel of FIG. 5.

FIG. 5 shows a touch panel 30 in accordance with an embodiment of the present invention. The touch panel 30 includes a sensing circuit 40 and a device 50 for controlling discharge of the sensing circuit 30. FIG. 6 shows the circuitry of sensing circuit 40. In the present embodiment, the sensing circuit 40 is the same as the sensing circuit 10 of FIG. 1. The sensing circuit 40 also includes a sensing electrode 400 and a discharging unit 410. The like reference numbers of FIG. 4 as those in FIG. 1 indicate the same elements, and therefore the connection relationships and operations thereof are omitted herein.

In a process of calibration, parasitic capacitance represented by a parasitic capacitor 404 of the sensing circuit 40 is precharged. Then discharge is executed by a large current source 427 having a constant current level in the discharging unit 410 for an interval $t_{LS}$. After that, the residual charges are completely discharged by a small current source 438. The discharging duration of the small current source 438 is $t_{SS}$.

Figure 7:
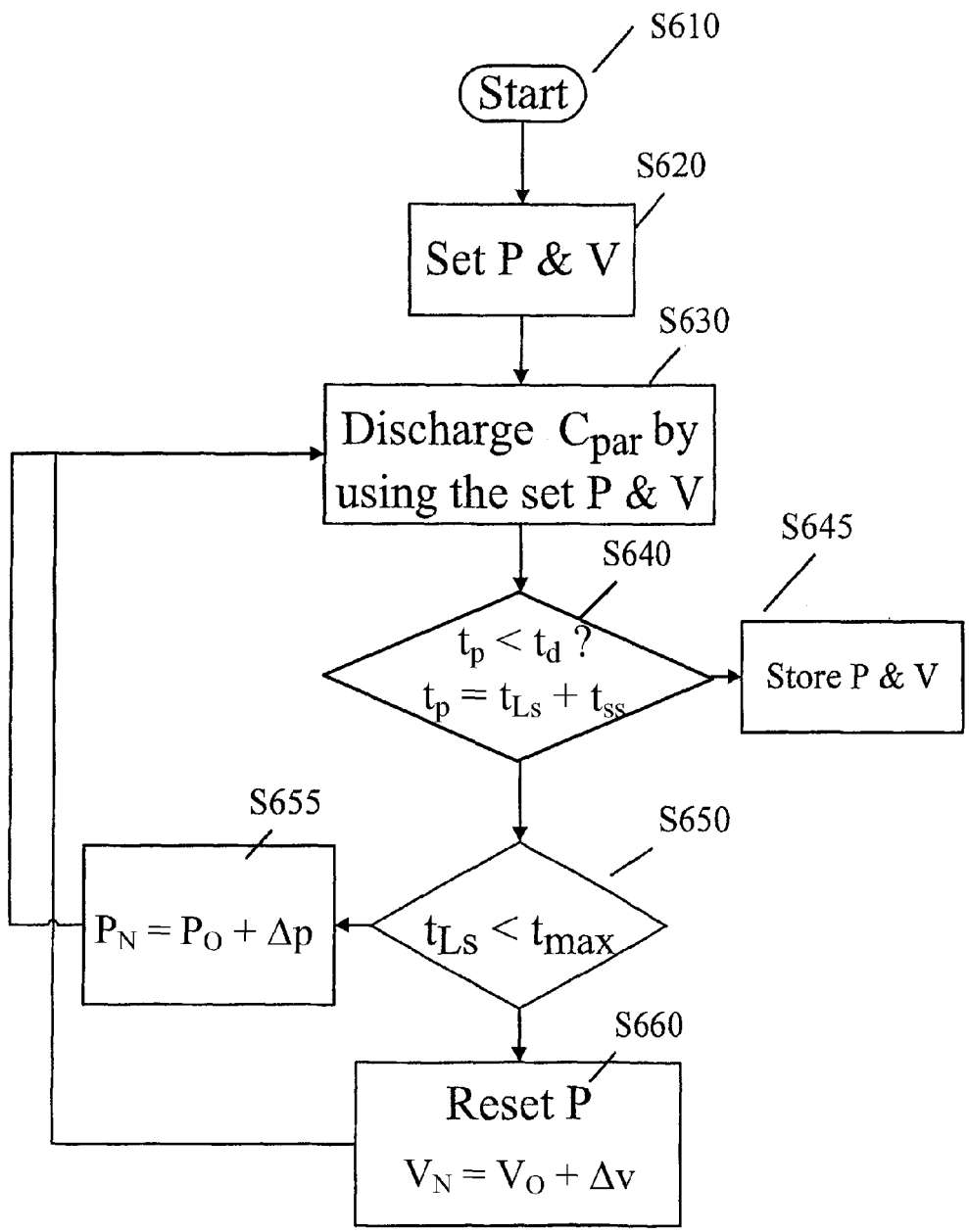
FIG. 7 is a flow chart showing a sensing circuit discharge control method in accordance with the present invention.

The present embodiment will be further described below with reference also to FIG. 7, which is a flow chart of the sensing circuit discharge control method in accordance with the present invention.

The device 50 has an edge detector 52, a main controller 54, a storage 55, a voltage controller 56 and a duration controller 58. The calibration process starts at step S610. In step S620, the main controller 54 sets the discharging duration $t_{LS}$ and current level of the large current source, where $t_{LS}=P \times T_C$, $T_C$ is the period of the clock. In accordance with the present invention, the main controller 54 does not directly set the time length of the discharging duration $t_{LS}$ of the large current source. Instead, the main controller 54 sets a value P. The discharging duration $t_{LS}$ of the large current source is P times the clock period $T_C$. In the present embodiment, an initial value P is a conservative estimate, that is, a smaller value. In practice, a voltage is easier to be controlled than a current. Accordingly, in the present embodiment, the voltage V of the large current source 427 is controlled so as to achieve the current setting. The discharging current level is proportional to the voltage value V. As described, P and V values are set in step S620. This amounts to indirectly setting the discharging duration $t_{LS}$ and current level of the large current source.

In step S630, the sensing circuit 40 discharges the parasitic capacitance $C_{par}$ by using the large current source with the discharging duration and current level until the discharge is completed. In step S640, the edge detector 52 detects a failing edge of a voltage waveform of the sensing electrode in the sensing circuit. That is, the edge detector 52 detects when the discharge is completed. The edge detector 52 has a counter (not shown) for counting how many clock periods are corresponding to the discharging duration of the waveform. The edge detector 52 passes a detection result to the main controller 54 so that the main controller 54 can determine if the total discharging duration $t_P$ is shorter than a predetermined duration $t_d$, where $t_P=t_{LS}+t_S$. In other words, the main controller 54 checks if it is possible to complete the discharge within the predetermined duration $t_d$. If so, it means that the set values are proper values, then the main controller 54 stores the set values into the storage 55 in step S645. If it is not possible to complete the discharge, it means that the voltage drop released by the large current source is insufficient. An adjustment is required.

If it is determined that the adjustment for the discharging condition of the large current source is required, the main controller 54 determines if the set discharging duration $t_{LS}$ of the large current source has exceeded a tolerable maximum discharging duration $t_{max}$. If not, the setting of the value P is adjusted. In the present embodiment, the adjustment for P can be slightly incremented since the initial value P is a smaller value, that is, $P_N=P_O+\Delta p$ shown in step S655 of FIG. 7, where $P_N$ is the adjusted value P, $P_O$ is the original value P, and $\Delta p$ is the incremented clock period number. For example, if the initial value of P is set as 7, that is, $P_O=7$, it means that the initial discharging duration of the large current source is 7 times the clock period $T_C$. The slight adjustment is an increment of 1 clock period, that is, $\Delta p=1$. Then, the discharging duration of the large current source is adjusted to 8 times the clock period $T_C$. That is, $P_N=7+1=8$. After the value P is adjusted, the process returns to step S630, the sensing circuit 40 discharges the parasitic capacitance $C_{par}$ by using the new discharging duration adjusted by the main controller 54 and the current level until the discharge is completed.

The discharging duration of the large current source cannot be unlimitedly extended. Therefore, the upper limit $t_{max}$ for the discharging duration is provided. In the present embodiment, after the value P is adjusted several times, for example, if it is determined that $t_{LS}$ exceeds $t_{max}$ in step S650, then the P is reset to the initial value, and the voltage controller 56 adjust the V level, $V_N=V_O+\Delta v$, where $V_N$ is the adjusted voltage level, $V_O$ is the original voltage level and $\Delta v$ is the incremented voltage level.

By means of some embodiments, the times of adjusting the discharging current level (voltage level) of the large current source in the sensing circuit of the touch panel can be reduced. The discharging duration of the large current source is adjusted in a digital manner so as to calibrate the discharging durations for the sensing capacitances of the respective sensing circuits, thereby the inconsistencies resulted from the parasitic capacitance variance due to the manufacture process can be eliminated.

Figure 8:
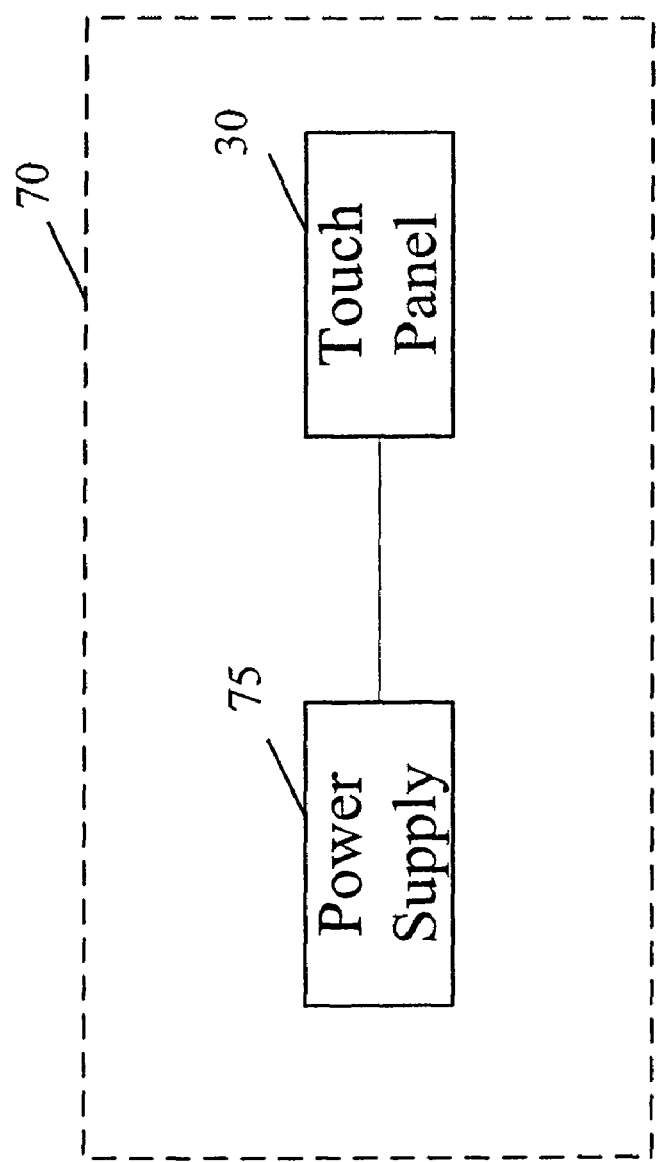
FIG. 8 is a block diagram schematically and generally showing an electronic apparatus having the touch panel in accordance with the present invention.

FIG. 8 shows an electronic apparatus 70 having the touch panel 30 in accordance with the present invention. The touch panel 30 (as shown in FIG. 5) including the device 50 for controlling the sensing circuit 40 can be a portion of the electronic apparatus 70. The electronic apparatus 70 comprises the touch panel 30 of the present invention and a power supply 75. The power supply 75 is coupled with the touch panel 30 to power the touch panel 30. The electronic apparatus 70 can be a cell phone, a digital camera, a PDA (Personal Digital Assistant), a notebook, a desktop a computer, a television set, a satellite navigator, a vehicle display, an aircraft display, a portable DVD player or the like.

While the preferred embodiment of the present invention has been illustrated and described in details, various modifications and alterations can be made by persons skilled in this art. The embodiment of the present invention is therefore described in an illustrative but not in a restrictive sense. It is intended that the present invention should not be limited to the particular forms as illustrated, and that all modifications and alterations which maintain the spirit and realm of the present invention are within the scope as defined in the appended claims.

What is claimed is:

1. A sensing circuit discharge control method, the sensing circuit comprising a sensing electrode and a discharging unit, the sensing electrode having a capacitance when no touch event occurs, while the capacitance increasing when a touch event occurs, the discharging unit having a first current source and a second current source, said method comprising:
   providing a clock having a clock period;
   setting a current level for the first current source;
   setting a value P, a discharging duration of the first current source being defined as P times the clock period;
   charging the sensing electrode;
   discharging the sensing electrode by the first current source with the set current level and discharging duration;
   discharging the sensing electrode by the second current source until discharge of the sensing electrode is completed;
   determining whether the discharge of the sensing electrode is completed within a predetermined duration; and
   adjusting the value P to adjust the discharging duration of the first current source if it is determined that the discharge of the sensing electrode is failed to be completed within the predetermined duration.

2. The method of claim 1, further comprising:
   storing the set current level and the value P if it is determined that the discharge of the sensing electrode is completed within the predetermined duration.

3. The method of claim 1, further comprising:
   setting an upper limit for the discharging duration of the first current source;
   determining if the discharging duration of the first current source exceeds the upper limit; and adjusting the current level if it is determined that the discharging duration of the first current source exceeds the upper limit.

4. The method of claim 1, wherein the value P is adjusted in an incremental manner in the adjusting step.

5. The method of claim 1, wherein the determining step comprises detecting a falling edge in a voltage waveform of the sensing electrode and determining whether the falling edge falls within the predetermined duration.

6. A sensing circuit discharge control device, the sensing circuit comprising a sensing electrode and a discharging unit, the sensing electrode having a capacitance when no touch event occurs, while the capacitance increasing when a touch event occurs, the discharging unit further having a first current source and a second current source for discharging the sensing electrode in turn after the sensing electrode has been charged, and a discharging current level of the first current source is much greater than that of the second current source, said device comprising:
an edge detector for detecting when discharge of the sensing electrode is completed;
a main controller for setting a value P to set a discharging duration of the first current source, which is P times a clock period, instructing the sensing electrode to be charged, instructing the first current source to discharge the sensing electrode with a set current level and the set discharging duration, instructing the second current source to discharge the sensing electrode until a discharge of the sensing electrode is completed and determining if the discharge of the sensing electrode is completed within a predetermine duration according to an output of the edge detector; and
a duration controller for adjusting the discharging duration of the first current source by adjusting the value P if the main controller determines that the discharge of the sensing electrode has failed to be completed within the predetermined duration.

7. The device of claim 6, further comprising a storage for storing the set current level and the value P if the main controller determines that the discharge of the sensing electrode is completed within the predetermined duration.

8. The device of claim 6, further comprising a voltage controller for controlling a voltage of the first current source to control the current level thereof, wherein the main controller sets an upper limit for the discharging duration of the first current source, determines whether the discharging duration of the first current source exceeds the upper limit and instructs the voltage controller to adjust the current level of the first current source if it is determined that the discharging duration of the first current source exceeds the upper limit.

9. The device of claim 6, wherein the duration controller adjusts the value P in an incremental manner.

10. The device of claim 6, wherein the edge detector detects a falling edge in a voltage waveform of the sensing electrode and outputs a detection result to the main controller, and the main controller determines if the falling edge falls within the predetermined duration.

11. A touch panel comprising:
a plurality of sensing circuits, each sensing circuit comprising:
a sensing electrode having a capacitance when no touch event occurs, the capacitance increasing when a touch event occurs; and
a discharging unit having a first current source and a second current source for discharging the sensing electrode in turn after the sensing electrode is charged, a current level of the first current source being much greater than that of the second current source; and
a sensing circuit discharge control device comprising:
an edge detector for detecting when discharge of the sensing electrode is completed;
a main controller for setting a value P to set a discharging duration of the first current source, which is P times a clock period, instructing the sensing electrode to be charged, instructing the first current source to discharge the sensing electrode with a set current level and the set discharging duration, instructing the second current source to discharge the sensing electrode until discharge of the sensing electrode is completed and determining if the discharge of the sensing electrode is completed within a predetermine duration according to an output of the edge detector; and
a duration controller for adjusting the discharging duration of the first current source by adjusting the value P if the main controller determines that the discharge of the sensing electrode is failed to be completed within the predetermined duration.

12. The touch panel of claim 11, wherein the sensing circuit discharge control device further comprises a storage for storing the set current level and the value P if the main controller determines that the discharge of the sensing electrode is completed within the predetermined duration.

13. The touch panel of claim 11, wherein the sensing circuit discharge control device further comprises a voltage controller for controlling a voltage of the first current source to control the current thereof, wherein the main controller sets an upper limit for the discharging duration of the first current source, determines whether the discharging duration of the first current source exceeds the upper limit and instructs the voltage controller to adjust the current level of the first current source if it is determined that the discharging duration of the first current source exceeds the upper limit.

14. The touch panel of claim 11, wherein the duration controller of the sensing circuit discharge control device adjusts the value P in an incremental manner.

15. The touch panel of claim 11, wherein the edge detector of the sensing circuit discharge control device detects a falling edge in a voltage waveform of the sensing electrode and outputs a detection result to the main controller to determine if the falling edge falls within the predetermined duration.

16. An electronic apparatus comprising:
a touch panel as claimed in claims 11; and
a power supply coupled with the touch panel to power the touch panel.

17. The electronic apparatus of claim 16, wherein the electronic apparatus is a cell phone, a digital camera, a PDA (Personal Digital Assistant), a notebook, a desktop computer, a television set, a satellite navigator, a vehicle display, an aircraft display, and a portable DVD player.

* * * * *